Aug. 19, 1952  A. GORDON  2,607,493
SEPARATOR
Filed June 30, 1948  3 Sheets-Sheet 1

Inventor:
Arthur Gordon,
By Christy, Schroeder,
Merriam, Holgren, Attys.

Aug. 19, 1952     A. GORDON     2,607,493
SEPARATOR

Filed June 30, 1948     3 Sheets-Sheet 2

Inventor:
Arthur Gordon,
By Christy, Schroeder, Merriam & Hofgren, Attys.

Aug. 19, 1952 — A. GORDON — 2,607,493

SEPARATOR

Filed June 30, 1948 — 3 Sheets-Sheet 3

Inventor:
Arthur Gordon,
By Chritton, Schroeder,
Merriam & Hofgren, Attys.

Patented Aug. 19, 1952

2,607,493

UNITED STATES PATENT OFFICE 2,607,493

SEPARATOR

Arthur Gordon, Chicago, Ill.

Application June 30, 1948, Serial No. 36,219

2 Claims. (Cl. 210—56)

This invention relates to a separator and more particularly to a separator to remove waste matter such as waste products suspended in water.

It is an object of this invention to provide means for expelling fumes from such a separator.

It is another object of this invention to provide means for preventing explosive fumes from accumulating in an oil separator or from being passed from the separator into the sewage system of a city or village.

It is a further object of this invention to provide an apparatus from which fumes are expelled by a pumping action caused by rises and falls in the liquid level thereof.

It is another object of the invention to provide a separator in which lighter fluids, such as gasoline, may be separated and recovered from heavier fluids with which they are intermixed.

It is another object of this invention to provide a readily removable filter for such a separator which filter may be easily cleaned or replaced.

Figure 1:
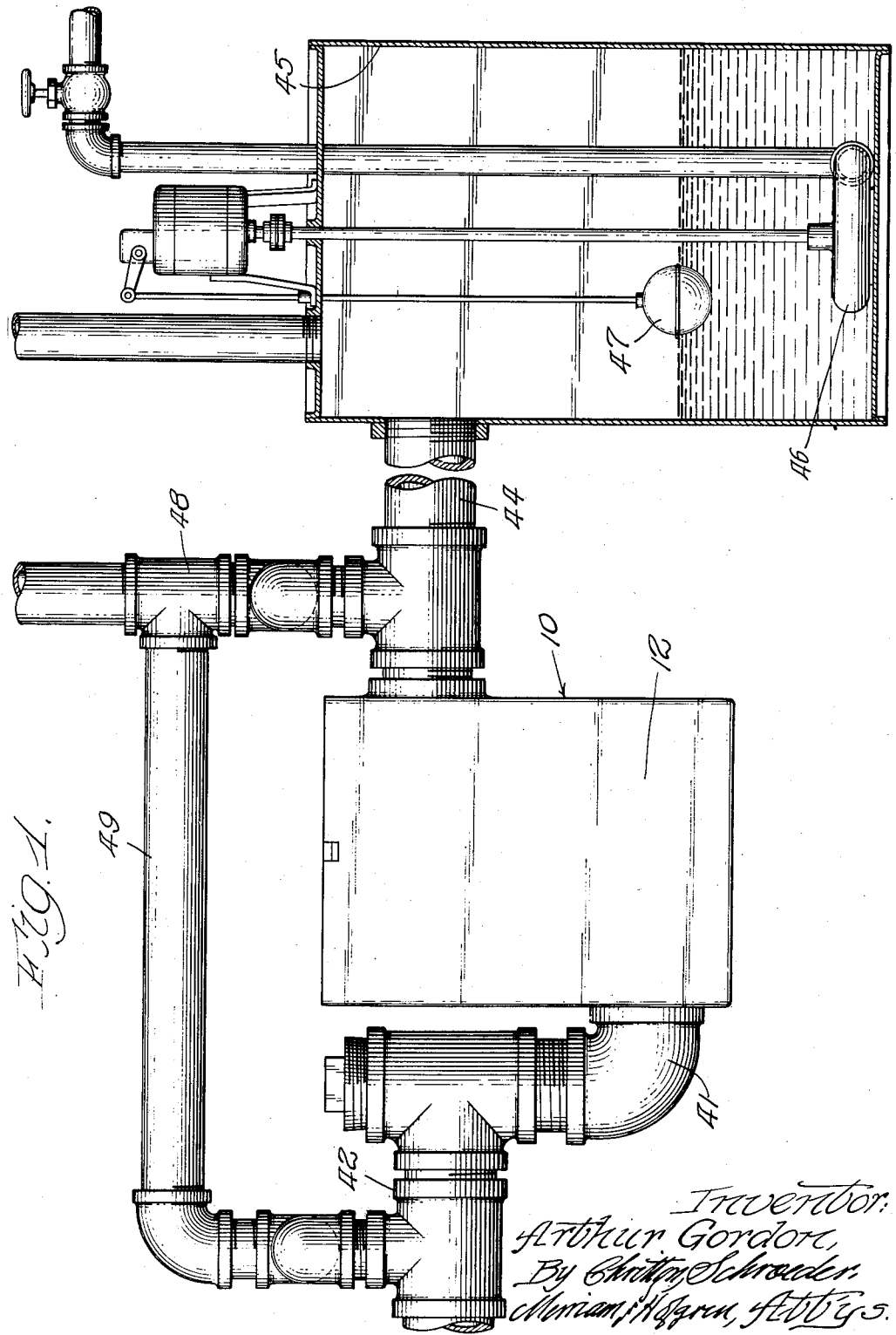
Figure 2:
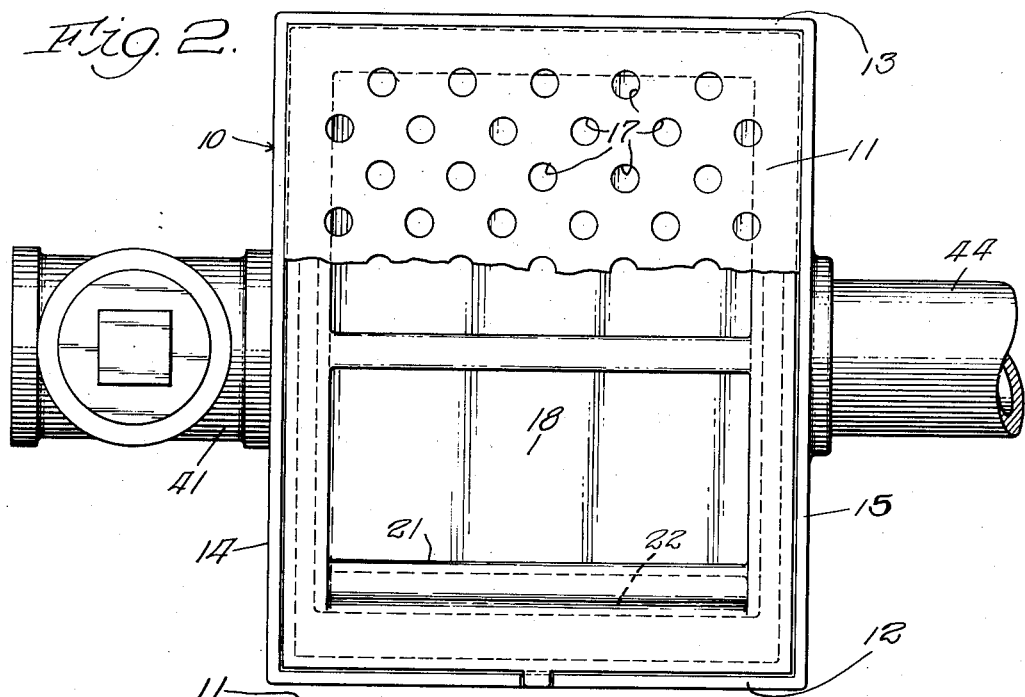
Figure 3:
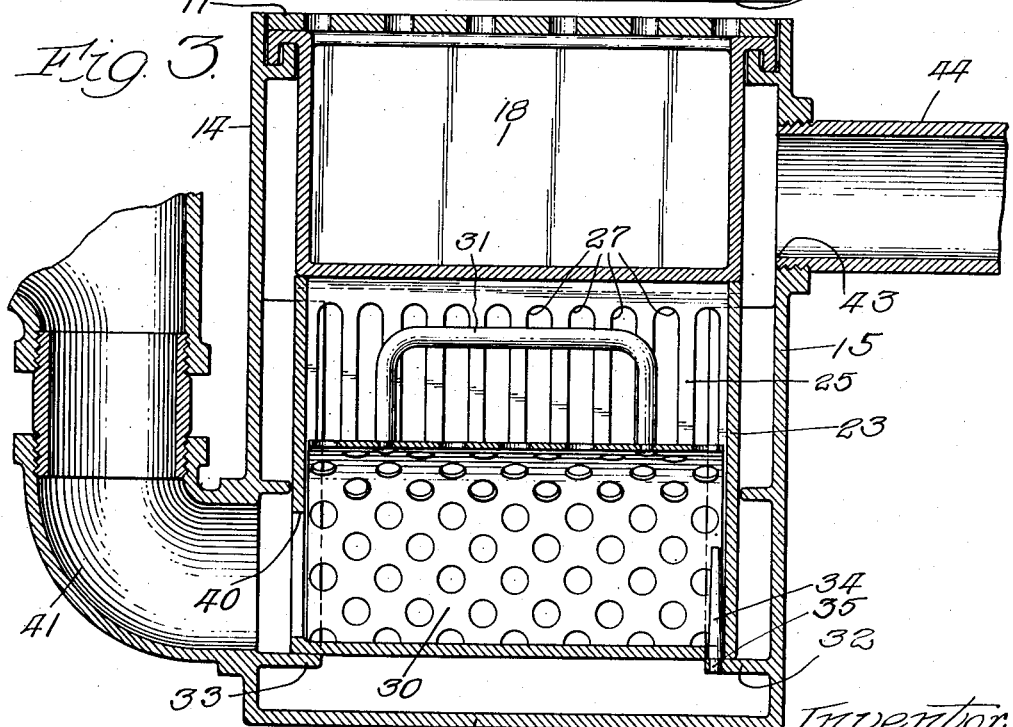
Figure 4:
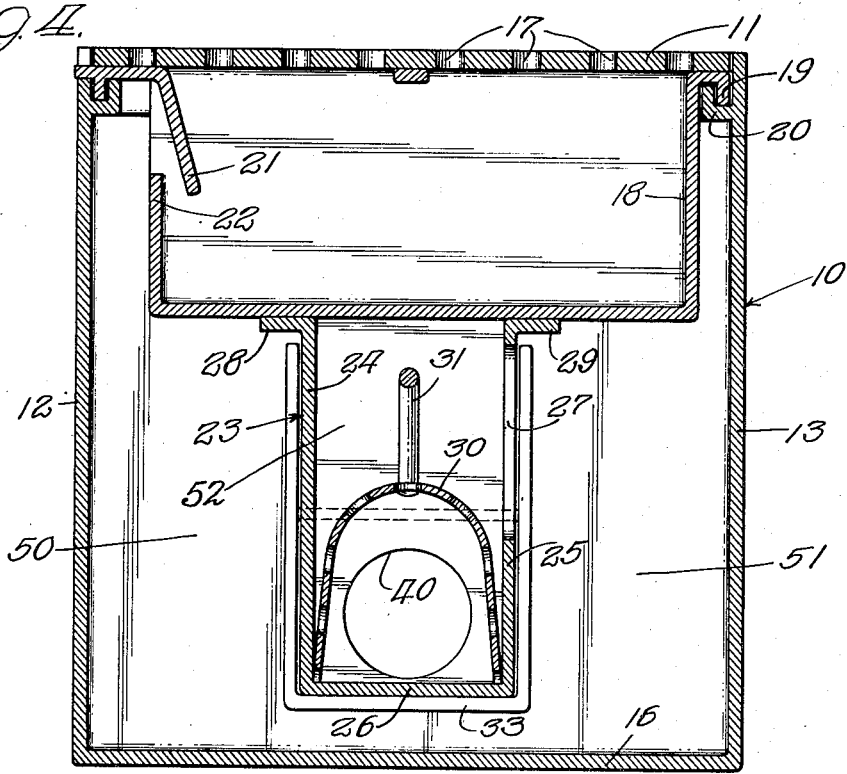
Figure 5:
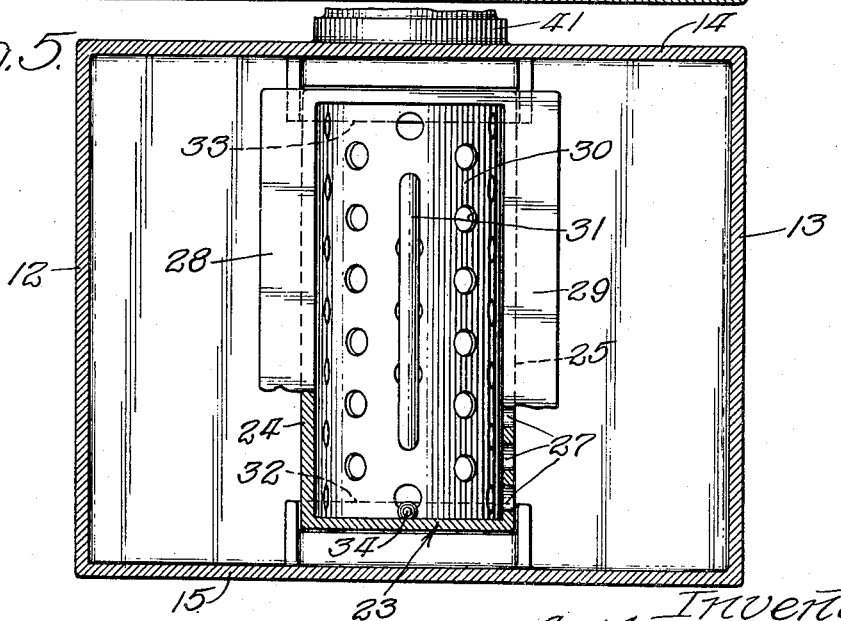

Other and further objects will be apparent from the following specification and drawings in which Fig. 1 is a side elevation partly in section of the device of the invention, Fig. 2 is a top plan view (partially broken away) of the separator, Fig. 3 is a vertical section through the separator, Fig. 4 is a vertical section taken 90° from the section of Fig. 3 and Fig. 5 is a horizontal section through the separator.

While the invention is susceptible of various modifications and alternative constructions, it is herein shown and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

Referring now to the drawings, 10 indicates a separator having a top 11, side walls 12 and 13, end walls 14 and 15 and bottom 16. The top 11 fits snugly between the upstanding edges of the side and end walls and is provided with a plurality of openings 17 therein. Positioned immediately beneath the top, is a basin member 18 provided with a lip 19 at its top fitting into a corresponding recess 20 in the walls. One side of the basin 18 is divided into two parts, the upper part 21 being spaced inwardly from and extending below the top of the lower part 22 to act as a trap when the basin 18 contains liquid, it being apparent that fluid, to flow over the top of the wall 22, must rise above the bottom of the wall 21. Heavy solids, such as gravel and sand, come to rest on the bottom of the basin and are not carried into the balance of the unit. A U-shaped member 23 divides the separator into three compartments and comprises two legs 24 and 25 and a bottom 26. The leg 25 has a plurality of elongated openings 27 formed therein through which liquid may flow in the manner hereinafter to be described. The top of the member 23 is provided with flanges 28 and 29 which rest snugly against the bottom of the basin 18. A screening member 30 rests upon the bottom of the U-shaped member and is provided with a handle 31 for ease of removal for cleaning. The particular type of screen may be chosen to fit the needs of the installation. For example in a garage installation a screen containing a wire mesh of the character of steel wool may be employed. The U-shaped member 23 rests upon shoulders 32 and 33 provided on the walls 14 and 15. In order to assure the proper positioning of the member 23 I prefer to supply the member with a leg 34 adapted to be received into an opening 35 in the shoulder 32 and provide no corresponding opening in the shoulder 33. Thus, it can be seen that the member 23 is insertable in one position only within the separator 10.

The separator just described is similar in many respects to the one shown in my U. S. Patent No. 2,099,061, issued on November 16, 1937. That separator is commonly referred to as an "all purpose" separator as it is adaptable for use under widely different circumstances. I have found, however, that when that separator is used in a garage for example, where oily liquids and other petroleum products including gasoline are passed through the separator a dangerous situation often arises. The explosive nature of gasoline fumes is well known and serious accidents may occur where fumes are permitted to accumulate in a separator or where they are passed from the separator into a sewer. It is not sufficient to merely vent the interior of the separator to the exterior thereof but it is extremely important that the opening of the vent on the exterior of the separator be at a considerable distance from the separator and preferably on the exterior of the building.

Accordingly I have invented a means of expelling fumes from such a separator which not only effectively removes fumes from the interior of the separator and prevents such fumes from entering the sewer but in addition provides a means of venting back pressure from a sewer to the atmosphere and thus prevent overflow or backing up of the separator due to excess sewer gas pressure.

The separator, therefore, is provided with an outlet 40 connected to a pipe 41 which extends upwardly from the outlet to connect with a sewer pipe 42. The vertical distance between the outlet 40 and the location of the sewer pipe 42 determines the normal liquid level within the separator and the area of the outlet is less than the area of the passage defined by the walls 21 and 22. On the opposite side of the casing is a second outlet 43 in the form of a circular opening whose lower edge is approximately at the normal liquid level. A pipe 44 leads from the outlet 43 into a container 45. The container is provided with a motor driven pump 46 controlled by a float 47 to remove the liquid as it accumulates within the container. Extending upwardly from the pipe 44 is a vent 48 which leads upwardly and thence preferably to the exterior of the building in which the separator is located. A second vent 49 connects the vent 48 with the sewer pipe 42 to vent to the atmosphere any sewer gases which may build up within the sewer.

In operation it is contemplated that my unit will be sunk in the floor of a garage, for example, with the top 11 substantially level with the garage floor. Liquid washed down into the separator passes through the opening 17 and fills the basin 18 to the level of the top edge of the side 22. Waste matter then spills over the top edge of that side and into a first chamber 50. From the chamber 50 the liquid flows in the space between the bottom of the separator 16 and the bottom 26 of the U-shaped member into a second compartment 51. Liquid may then pass through the openings 27 in the leg 25 and into the third chamber 52. Liquid filtering through the screen 30 may then enter the outlet 40 and pass to the sewer. Lighter fluids such as gasoline introduced into the separator will naturally float on top of heavier fluids therein. As fresh waste matter is introduced into the separator the level of the liquid therein will temporary rise above the normal liquid level determined by the location of the sewer pipe 42 and thus the lighter fluids such as gasoline may flow through the pipe 44 and be recovered in the container 45. As the basin 18 provides a hermetic seal between itself and the walls of the separator and thus renders the separator substantially airtight, any rise in liquid level which decreases the air space within the separator forces vapors out through the outlet 43 and into the vent 49. During constant use this "pumping" action of the liquid within the separator effectively forces explosive fumes into the vent where they may be dispelled to the atmosphere.

A further important feature of the particular apparatus shown is that should any of the screens or passages become clogged by grease or foreign matter such as paper and the like, the entire separator will fail to operate and will in time fill with liquid to the point where no additional liquid will pass through the holes 17. The resulting flood is ample and adequate warning that the top 17 should be lifted as well as the basin 18 and the U-shaped member 23, in order that all interior parts of the separator may be cleaned and the clogging matter removed. Thus, if the separator is capable of receiving water through the opening 17, one can be assured that the device is functioning properly, and should the device become inoperative through clogging, such inoperative state is immediately announced by the flooding of the floor adjacent the top of the separator.

Coupled with the advantages of ease of cleaning, is the further advantage that where the unit is used to separate waste matter which includes by-products, the screen itself aids in the recovery of products which would otherwise be lost. For example, when used in a tannery the screen catches and holds animal hair, a valuable by-product of tanning. An overflow of the separator indicates that the screen is clogged, whereupon it may be removed and the clogging hair recovered and sold.

I claim:

1. A liquid separating apparatus comprising a separator casing having a plurality of connected separating compartments therein, a foraminous top for the casing, a liquid retaining basin beneath the top and above the compartments and into which liquid entering the separator passes, said basin having formed in one side wall thereof an opening forming a passage located above the bottom of the basin and having an upwardly extending portion interconnecting the basin and one of the compartments, a conduit forming an outlet connected to one of said compartments near the bottom of said casing and extending upwardly therefrom to determine a normal liquid level in the separator with said liquid level being intermediate said passage and said outlet and defining a closed vapor space with the separator, a second outlet connected at one end to the vapor space just above the normal liquid level therein, the other end of said second outlet being connected to a container, and a vapor vent opening at one end to said second outlet and opening at the other end to the atmosphere remote from the separator, said second outlet and said vapor vent being open at all times during normal operation of the apparatus and said passage having an area greater than the area of said first outlet whereby liquid entering the separator causes a rise in the liquid level therein to force vapor in said vapor space into the vapor vent and to float lighter fluids into the second outlet.

2. A liquid separating apparatus comprising a separator casing, a foraminous top for the casing through which liquids enter the casing, a liquid retaining basin located immediately beneath the foraminous top and having a tight seal around its periphery with said casing, a cubical removable member extending from the bottom of said basin downwardly to a point short of the bottom of said casing to divide the portion of said casing not occupied by said basin into three compartments, said cubical member having a grilled construction near the top of one wall thereof to provide communication between the compartment formed on the interior of said member and one of the remaining two compartments in said casing, said basin having formed in one side wall thereof an opening forming a passage located above the bottom of the basin and having an upwardly extending portion interconnecting the basin and one of the compartments outside of said cubical member, a conduit forming an outlet connected to the compartment formed within said cubical member and extending upwardly therefrom to determine a normal liquid level in the separator with said liquid level being intermediate said passage and said outlet and between the two defining a closed vapor space within the separator, a second outlet connected at one end to the vapor space just above the normal liquid level therein, the other end of said second outlet being connected to a container, and a vapor vent opening at one end to said second outlet and opening at the other end to the atmosphere remote from the separator, said second outlet and said vapor vent being open at all times during normal operation of the apparatus to permit of continuous discharge of vapors and liquids having the lowest specific gravity of those in the separator.

ARTHUR GORDON.

REFERENCES CITED

The following references are of record in the file of this patent:

UNITED STATES PATENTS

| Number | Name | Date |
|---|---|---|
| 1,122,625 | McNutt | Dec. 29, 1914 |
| 1,910,186 | Sisk | May 23, 1933 |
| 2,095,024 | Boosey | Oct. 5, 1937 |
| 2,099,061 | Gordon | Nov. 16, 1937 |
| 2,102,430 | McLeod | Dec. 14, 1937 |
| 2,328,027 | Muller | Aug. 13, 1943 |